United States Patent
Hwang et al.

(10) Patent No.: US 10,198,437 B2
(45) Date of Patent: Feb. 5, 2019

(54) MACHINE TRANSLATION DEVICE AND MACHINE TRANSLATION METHOD IN WHICH A SYNTAX CONVERSION MODEL AND A WORD TRANSLATION MODEL ARE COMBINED

(75) Inventors: Young Sook Hwang, Seoul (KR); Sang-Bum Kim, Seoul (KR); Chang Hao Yin, Seoul (KR); Yeon Su Lee, Seoul (KR); Seong Wook Lee, Seoul (KR); Hae Chang Rim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 429 days.

(21) Appl. No.: 13/883,758

(22) PCT Filed: Jul. 20, 2011

(86) PCT No.: PCT/KR2011/005325
§ 371 (c)(1),
(2), (4) Date: May 6, 2013

(87) PCT Pub. No.: WO2012/060540
PCT Pub. Date: May 10, 2012

(65) Prior Publication Data
US 2013/0226556 A1    Aug. 29, 2013

(30) Foreign Application Priority Data
Nov. 5, 2010 (KR) .................. 10-2010-0109546

(51) Int. Cl.
*G06F 17/28* (2006.01)

(52) U.S. Cl.
CPC ........ *G06F 17/289* (2013.01); *G06F 17/2818* (2013.01); *G06F 17/2872* (2013.01)

(58) Field of Classification Search
CPC . G06F 17/289; G06F 17/2872; G06F 17/2818
(Continued)

(56) References Cited

U.S. PATENT DOCUMENTS 5,587,902 A * 12/1996 Kugimiya ............. G06F 17/218
                                                                    704/2
5,826,219 A * 10/1998 Kutsumi ............... G06F 17/271
                                                                    704/2
(Continued)

FOREIGN PATENT DOCUMENTS

EP              0357344 A2 *  3/1990    ........... G06F 17/271
KR       1020050064574         6/2005
KR       10-2008-0052282 A     6/2008

OTHER PUBLICATIONS

Zens et al, "A comparative study on reordering constraints in statistical machine tranlation," Proceedings of the 41st Annual Meeting on Association for Computational Linguistics, vol. 1, pp. 144-151.*

(Continued)

*Primary Examiner* — Lamont M Spooner
*Assistant Examiner* — Oluwadamilola M Ogunbiyi
(74) *Attorney, Agent, or Firm* — Brinks Gilson & Lione

(57) ABSTRACT

The present invention relates to statistical machine translation, and provides a machine translation device and a machine translation method that acquire a creation probability for a target language from a single corpus while extracting respective conversion probabilities by extracting syntax conversion knowledge and word translation knowledge from a parallel corpus, model a weighted translation model by allowing each of the conversion knowledge and each of the probabilities to learn using a translation model learning device, and generate a target sentence through decoding processes of a syntax converter and a word translator by applying the translation model to a source sentence input in real time, thereby resolving disadvantages of the existing phrase-based SMT and syntax-based SMT and combining advantages thereof.

6 Claims, 7 Drawing Sheets

(58) Field of Classification Search
USPC .......................................................... 704/2
See application file for complete search history.

(56) References Cited

U.S. PATENT DOCUMENTS

| | | | | |
|---|---|---|---|---|
| 7,454,326 | B2* | 11/2008 | Marcu et al. ..................... | 704/2 |
| 8,121,829 | B2* | 2/2012 | Hwang et al. .................... | 704/4 |
| 8,150,677 | B2* | 4/2012 | Menezes et al. ................. | 704/2 |
| 8,204,735 | B2* | 6/2012 | Kamatani et al. ................ | 704/4 |
| 8,600,728 | B2* | 12/2013 | Knight et al. .................... | 704/2 |
| 8,886,518 | B1* | 11/2014 | Wang ................. G06F 17/2818 704/1 |
| 2003/0023423 | A1* | 1/2003 | Yamada ............. G06F 17/2818 704/2 |
| 2004/0193401 | A1* | 9/2004 | Ringger ............. G06F 17/2715 704/9 |
| 2006/0142995 | A1* | 6/2006 | Knight et al. .................... | 704/9 |
| 2006/0282255 | A1* | 12/2006 | Lu ...................... G06F 17/2827 704/2 |
| 2007/0150257 | A1* | 6/2007 | Cancedda .......... G06F 17/2827 704/2 |
| 2007/0265826 | A1* | 11/2007 | Chen .................. G06F 17/2818 704/2 |
| 2007/0282590 | A1* | 12/2007 | Suzuki ................. G06F 17/274 704/2 |
| 2008/0154577 | A1* | 6/2008 | Kim et al. ......................... | 704/2 |
| 2008/0319736 | A1* | 12/2008 | Toutanova .......... G06F 17/2818 704/9 |
| 2009/0043564 | A1* | 2/2009 | Hwang et al. .................... | 704/4 |
| 2009/0063128 | A1* | 3/2009 | Seo et al. .......................... | 704/2 |
| 2009/0089058 | A1* | 4/2009 | Bellegarda ............ G06F 17/277 704/251 |
| 2009/0106015 | A1* | 4/2009 | Li et al. ............................ | 704/2 |
| 2009/0119090 | A1* | 5/2009 | Niu ........................ G06F 17/24 704/1 |
| 2009/0281789 | A1* | 11/2009 | Waibel ................ G06F 17/2735 704/3 |
| 2009/0326913 | A1* | 12/2009 | Simard ............... G06F 17/2836 704/2 |
| 2010/0070261 | A1* | 3/2010 | Jin et al. ........................... | 704/2 |
| 2010/0138210 | A1* | 6/2010 | Seo ...................... G06F 17/273 704/2 |
| 2010/0138213 | A1* | 6/2010 | Bicici ................. G06F 17/2836 704/4 |
| 2010/0179803 | A1* | 7/2010 | Sawaf et al. ...................... | 704/2 |
| 2011/0178791 | A1* | 7/2011 | Stymne ............... G06F 17/2755 704/2 |
| 2011/0282643 | A1* | 11/2011 | Chatterjee ........... G06F 17/2818 704/2 |
| 2013/0144592 | A1* | 6/2013 | Och ...................... G06F 17/273 704/2 |

OTHER PUBLICATIONS

Fraser et al, "Getting the structure right for word alignment: LEAF," Jun. 2007, Proceedings of the 2007 Joint Conference on Empirical Methods in Natural Language Processing and Computational Natural Language Learning, pp. 51-60.*

Hassan, "Lexical Syntax for Statistical Machine Translation," Jan. 2009, Dissertation paper at Dublin City University. Web availability <http://www.localisation.ie/oldwebsite/resources/Awards/Theses/Hany_Hassan.pdf>.*

Mathias, "Statistical Machine Translation and Automatic Speech Recognition under Uncertainty," Dec. 2007, Dissertation paper at Johns Hopkins University. Web availability: <http://citeseerx.ist.psu.edu/viewdoc/download?doi=10.1.1.422.2756&rep=rep1&type=pdf>.*

Gildea, Daniel. "Loosely tree-based alignment for machine translation." Proceedings of the 41st Annual Meeting on Association for Computational Linguistics-vol. 1. Association for Computational Linguistics, 2003.*

Huang, Liang, Kevin Knight, and Aravind Joshi. "Statistical syntax-directed translation with extended domain of locality." Proceedings of AMTA. 2006.*

International Search Report dated Feb. 20, 2012 for PCT/KR11/005325, citing the above reference(s).

Yeong-Suk Hwang, Introduction of Statistics-based Machine Translation Technology and Research Trends, Journal of Institute of Language and Information Studies, vol. 25, pp. 89-114, Apr. 30, 2010.

S.H. Kim et al., Electronics and Telecommunication Trends of ETRI, vol. 25 No. 3, pp. 28-39, Jun. 30, 2010.

Un-Oe Kim et al., Electronics and Telecommunication Trends of ETRI, vol. 23 No. 1, pp. 89-97, Feb. 28, 2008.

Chao, Wenhan, "Studies on the Key Techniques of Bilingual Corpus-Based Machine Translation," Chinese Doctoral Dissertations Full-text Database Information Science and Technology, May 15, 2010, Issue May 2010, China Academic Journals (cd) Electronic Publishing House, Beijing, China.

* cited by examiner

MACHINE TRANSLATION DEVICE AND MACHINE TRANSLATION METHOD IN WHICH A SYNTAX CONVERSION MODEL AND A WORD TRANSLATION MODEL ARE COMBINED

CROSS REFERENCE TO RELATED APPLICATION

This application claims the priority of Korean Patent Application No. 10-2010-0109546, filed on Nov. 5, 2010 in the KIPO (Korea Intellectual Property Office). Further, this application is the National Phase application of International Application No. PCT/KR2011/005325 filed Jul. 20, 2011, which designates the United States and was published in Korean.

TECHNICAL FIELD

The present invention relates to statistical machine translation, and more particularly, to a machine translation in which a syntax conversion model and a word translation model are combined to generate a target language sentence through decoding processes of a syntax converter and a word translator by modeling a translation step as two steps of a syntax conversion process and a word translation process, and applying this model to a source language sentence input in real time, and a machine translation method.

BACKGROUND ART

An automatic translation technology means a software technology that automatically converts one language into another language. A research into the technology has started for a military purpose in U.S. from the mid of 20C. In these days, the technology had been actively researched by a plurality of laboratories and private companies for the purpose of extension of an information access range and innovation of a human interface worldwide.

In an initial step of the automatic translation technology, the automatic translation technology has been developed based on a bilingual dictionary manually prepared by a specialist and a rule to convert one language into another language. However, development of a statistical translation technology that automatically learns a translation algorithm statistically from mass data has been in active progress from the beginning of 21C when computing power is rapidly developed.

A statistical machine translation (SMT) system statistically models a translation process and learns a translation knowledge and a translation probability, and a creation probability for a target language from mass parallel corpora to generate a target sentence most appropriate to a source sentence input based thereon.

The recent statistical machine translation system may be generally classified into a phrase-based SMT (hereinafter, referred to as PBSMT) type and a syntax (grammar)-based SMT (hereinafter, SBSMT) type.

The PBSMT, which translates consecutive word string (hereinafter, referred to as a phrase) as one unit instead of performing individual word to word translation, is a method for generating a phrase combination which has the most probability during decoding after learning a translation knowledge and a translation probability of phrase to phrase.

The most representative model of the PBSMT is Koehn et al., 2003 and Och and Ney, 2004a. This model is simple and is characterized in that a short-distance word order is easily changed, and translation expressed with several words is naturally performed. However, in this model, a long-distance word order is not easily changed and in particular, a big problem is caused in a pair of languages which are significantly different from each other in word order, such as English-to-Korean translation. The reason is that only some of all available permutations between phrases are considered without explicitly modeling intergrammer conversions to determine the word order in a sentence in the translation model of the PBSMT.

Therefore, in recent years, a method of modeling conversion of a grammar-based syntax has been primarily researched and is called the SBSMT. The SBSMT learns tree-to-tree or tree-to-character string conversion knowledge and probability from a syntaxtree corresponding to two languages in parallel corpora in order to learn the syntax conversion knowledge. The SBSMT is characterized in that the long-distance word order is more easily changed and non-consecutive phrases are more easily translated than the PBSMT. However, since the SBSMT is significantly dependent on the performance of a parser and translation knowledge is constrained to a grammatical phrase unit, translation knowledge to be used itself is much smaller. As a result, when there is no translation knowledge to be used, translation of consecutive word strings becomes simple word-to-word translation or unnatural translation which is not matched with linked words. Representative methods include Galley et al., 2004, 2006, Lavie et al., 2008, Yamada and Knight, Gildea et al., and the like.

Like this, in the statistical machine translation technology in the related art, the PBSMT type improves fluency of consecutive word translation, but fails to change the long-distance word order to thereby generate a completely different sentence. In the SBSMT type, a word order of a generated target sentence is correct, but simple word-to-word translation is performed due to a shortage in translation knowledge, and as a result, translation is not natural.

DISCLOSURE

Technical Problem

The present invention is contrived to solve the problem and an object of the present invention is to provide a machine translation device and a machine translation method that acquire a creation probability for a target language from a single corpus while extracting respective conversion probabilities by extracting syntax conversion knowledge and word translation knowledge from a parallel corpus, model a weighted translation model by allowing each of the conversion knowledge and each of the probabilities to learn using a translation model learning device, and generate a target sentence through decoding processes of a syntax converter and a word translator by applying the translation model to a source sentence input in real time, thereby resolving disadvantages of the existing phrase-based SMT and syntax-based SMT and combining advantages thereof.

Technical Solution

According to a first aspect of the present invention, a statistical machine translation device includes: a translation model constructor extracting syntax conversion knowledge and word translation knowledge of a target sentence by using word reordering information between a source sentence and the target sentence and syntax analysis information of the source sentence in a plurality of parallel corpora, and calculating conversion probabilities with respect to the respective extracted knowledge; a translation model learning device generating a syntax conversion model and a word translation model by learning the respective translation knowledge and conversion probabilities extracted through the translation model constructor; and a translated sentence generator decoding the source sentence into the target sentence by applying the syntax conversion model and the word translation model learned through the translation model learning device with respect to a source sentence input in real time.

According to a second aspect of the present invention, a translation model constructing apparatus includes a syntax conversion knowledge extractor extracting the syntax conversion knowledge for a target sentence by using word reordering information between a source sentence and a target sentence, and syntax analysis information of the source sentence in a plurality of parallel corpora and calculating a conversion probability with respect to the extracted knowledge; and a word translation knowledge extractor extracting the word translation knowledge by using the word reordering information between the source sentence and the target sentence, and the syntax analysis information of the source sentence in the plurality of parallel corpora and calculating the conversion probability with respect to the extracted knowledge.

According to a third aspect of the present invention, a translation sentence generating apparatus includes: a syntax converter syntactically analyzing a source sentence input in real time, extracting syntax conversion knowledge of a target sentence from a syntax of the analyzed source sentence, and making learning a conversion probability with respect to the extracted knowledge; a word translator generating a target vocabulary string based on a word translation model in which a constraint condition is imposed to the syntax of the target sentence extracted through the syntax converter; and a probability calculator combining a creation probability of the target vocabulary string extracted through the word translator with the conversion probability extracted through the syntax converter and thereafter, generating a target vocabulary string having the highest probability into a translation sentence.

According to a fourth aspect of the present invention, a translation model constructing method includes (a) extracting syntax conversion knowledge for a target sentence by using word reordering information between a source sentence and a target sentence and syntax analysis information of the source sentence in a plurality of parallel corpora; (b) extracting word translation knowledge by using the word reordering information between the source sentence and the target sentence and the syntax analysis information of the source sentence in the plurality of parallel corpora; and (c) calculating conversion probabilities for the syntax conversion knowledge and the word translation knowledge, respectively and making a weight to be learned with respect to each conversion probability.

According to a fifth aspect of the present invention, a machine translation method includes: (a) syntactically analyzing a source sentence input in real time and extracting syntax conversion knowledge and a conversion probability of a target sentence from a syntax of the analyzed source sentence; (b) generating a target vocabulary string based on a word translation model in which a constraint condition is imposed to the syntax of the target sentence extracted from the syntax conversion knowledge of the target sentence; and (c) generating a target vocabulary string having a high probability into a translation sentence by combining the syntax conversion probability of the target sentence and a creation probability of the target vocabulary string.

Advantageous Effects

According to the present invention, disadvantages of the existing vocabulary-based translation model and syntax-based translation model can be resolved and advantages of the models can be combined.

That is, according to the present invention, the performance of long-distance word rearrangement can be improved through the syntax conversion model and appropriate translation suitable for a context is performed to improve appropriateness and naturalness of a translation sentence because mass non-syntactic conversion knowledge is used.

Figure 1:
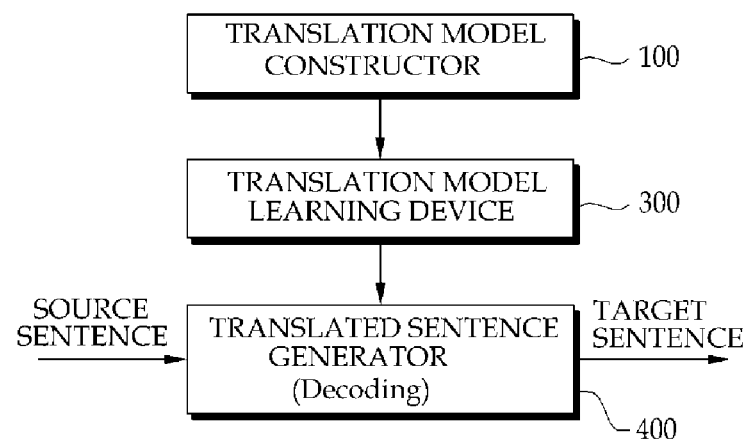
FIG. 1 is a diagram illustrating a configuration of a machine translation device according to an exemplary embodiment of the present invention.

DESCRIPTION OF MAIN REFERENCE
NUMERALS OF DRAWINGS

100: Translation model constructor
110: Syntax conversion knowledge extractor
120: Syntax conversion knowledge DB
130: Word translation knowledge extractor
140: Word translation knowledge DB
150: Language model generator
160: Language model
300: Translation model learning device
400: Translated sentence generator
410: Syntax converter
420: Word translator
111: Sentence selector
113: Source tree generator
115: Tree node reorderer
117: Tree conversion knowledge extractor
119: Probability calculator 421: Feature extractor
422: Translation option generation
423: Translation option constraining device
424: Hypothesis search
425: Translation distortion constraining device

BEST MODE

Hereinafter, exemplary embodiments of the present invention will be described in detail with reference to the accompanying drawings. A configuration of the present invention and an operational effect thereof will be clearly understood through the following detailed description. Prior to the detailed description of the present invention, it should be noted that the same components refer to the same reference numerals anywhere as possible in the drawings and the detailed description will be omitted when known configurations may make the subject matter of the present invention unnecessarily ambiguous.

A source sentence or a source language sentence to be described below is a sentence of a source language to be translated and a target sentence or a target language sentence means a sentence of a target language output by translating the source sentence into a desired language.

Figure 2:
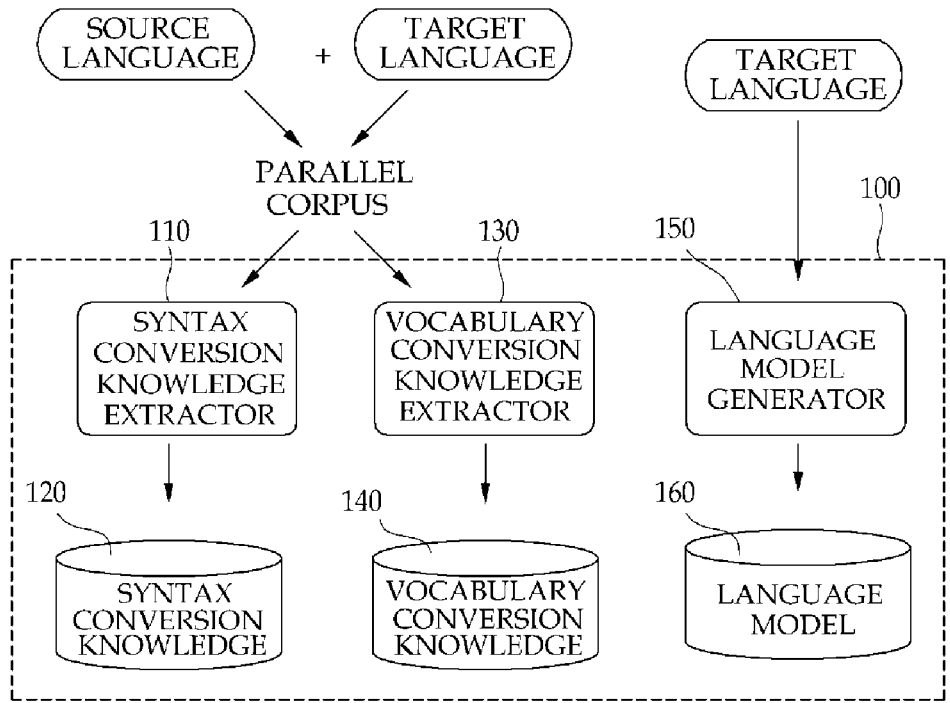
FIG. 2 is a diagram illustrating a configuration in which the machine translation device according to the exemplary embodiment of the present invention is divided into a syntax conversion model and a word translation model.

FIG. 1 is a diagram illustrating a configuration of a machine translation apparatus according to an exemplary embodiment of the present invention. FIG. 2 is a diagram illustrating a configuration in which the machine translation apparatus according to the exemplary embodiment of the present invention is separated into a syntax conversion model and a word translation model.

Referring to FIGS. 1 and 2, the machine translation device according to the exemplary embodiment of the present invention generally includes a translation model constructor 100, a translation model learning device 300, and a translated sentence generator 400.

The translation model constructor 100 includes a syntax conversion knowledge extractor 110 and a word translation knowledge extractor 130 which extract syntax conversion knowledge and word translation knowledge from parallel corpora constituted by a source language and a target language, and calculate respective conversion probabilities. The extracted syntax conversion knowledge and word translation knowledge are stored in a syntax conversion knowledge DB 120 and a word translation knowledge DB 140, respectively.

Further, the translation model constructor 100 includes a language model generator 150 extracting a creation probability of a language from a single corpus configured by the target language. The creation probability of the extracted language is stored in a language model DB 160 to construct a language model.

The translation model learning device 300 learns a weight of each feature extracted through the translation model constructor 100. The translation model learning device 300 may similarly use a method of minimum error learning (MERT) of Bertoldi, Haddow, and Fouet, 2009.

Figure 3:
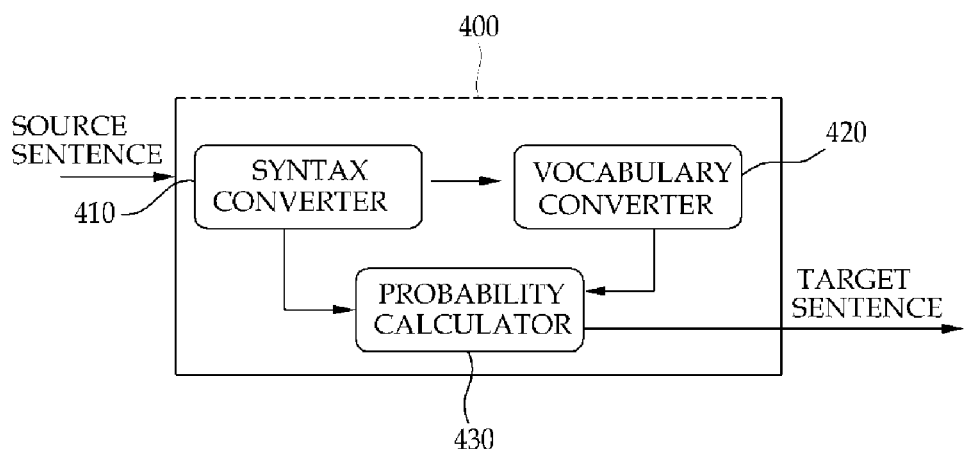
FIG. 3 is a diagram illustrating a configuration of a translated sentence generator according to the exemplary embodiment of the present invention.

The translated sentence generator 400 performs two steps of decoding processes. That is, a first step is a syntax conversion process and a second step is a word translation process. Each of the steps is performed in a syntax converter 410, a word translator 420, and a probability calculator 430 illustrated in FIG. 3.

That is, the syntax converter 410 that performs the first step generates N target syntaxes which have high probabilities, and based on the result, the word translator 420 of performing the second step selects M target vocabulary strings which have the highest probability from available target vocabulary strings. The probability calculator 430 finally outputs a target vocabulary string which has the highest probability into a translation sentence after combining N probabilities generated in the syntactic converter 410 and M probabilities generated in the word translator 420.

Therefore, the machine translation device according to the exemplary embodiment of the present invention extracts the syntax conversion knowledge and the word translation knowledge and respective conversion probabilities from parallel corpora constituted by the source language and the target language, and acquires a creation probability of the target language from a single corpus to model a weighted translation model by making the respective conversion knowledge and probabilities learned. In addition, by applying a translation model of which modeling is completed to a source sentence input in real time, a final target sentence is generated through two decoding processes of the syntax converter 410 and the word translator 420.

Constituent members of the machine translation device will be described in detail.

The translation model constructor 100 is a module that extracts a translation knowledge and a translation probability as illustrated in FIG. 2.

In particular, the translation model constructor 100 according to the exemplary embodiment of the present invention is based on a statistical translation model to be described below. Assumed that a sentence e is constituted by a syntax S(e) and a vocabulary string L(e), the sentence may be expressed as illustrated in Equation 1 by using all available syntaxes S(e).

$$e = \sum_{S(e)} \langle S(e), L(e) \rangle \qquad \text{[Equation 1]}$$

In this case, translating a source sentence f into a target sentence e may be defined as illustrated in the following Equation 2. That is, a sentence ê having the maximum probability among probabilities that the source sentence f is translated into the target sentence e is set as a translation sentence.

$$\hat{e} = \operatorname*{argmax}_{e} p(e \mid f) \qquad \text{[Equation 2]}$$

In the present invention, the above basic translation model concept is separated into a syntax conversion model and a word translation model as illustrated in the following Equation 3.

$$\begin{aligned} p(e \mid f) &= \sum_{S(e)} p(S(e), L(e) \mid S(f), L(f)) \qquad \text{[Equation 3]} \\ &= \sum_{S(e)} p(S(e) \mid S(f), L(f)) \times p(L(e) \mid S(e), S(f), L(f)) \end{aligned}$$

That is, in Equation 3, p(S(e)|S(f),L(f)) represents the syntax conversion model and p(L(e)|S(e),S(f),L(f)) represents a word translation model.

The syntax conversion model means a probability that a syntax S(e) of any target sentence will be shown when a vocabulary string L(f) of the source sentence and the syntax S(f) of the source sentence are given. The word translation model means a probability that a vocabulary string L(e) of a predetermined target sentence will be shown when the vocabulary string L(f) and the syntax S(f) of the source sentence and the syntax S(e) of the target sentence are given. In this case, the syntax S(f) of the source sentence may be uniquely determined by using a parser that extracts a 1-best result.

The syntax conversion model will be developed below in detail.

$$p(S(e) | S(f), L(f)) = \prod_i p(s_i(e_i) | S(f), L(f))$$ [Equation 4]

$$= \prod_i p(s_i(e) | s_1(f), s_2(f), \ldots, s_J(f), L(f))$$

$$= \prod_i p(d_i | L(f))$$

$$= \prod_i p(d_i | l_i(f))$$

In Equation 4 above, $S_i$ means an i-th sub-tree of S (syntax), and a sub-tree of a source syntax and a sub-tree of a target syntax may correspond to each other by i. $L_i$ means a partial character string of a sentence corresponding to the i-th sub-tree. $d_i$ means a derivation to $s_i(e)$ from $s_i(f)$. In this case, in Equation 4, it is assumed that sub-trees are independent from each other and the respective derivations are independent from each other, and the sub-tree is independent from an external vocabulary string.

A word translation model part may be developed according to feature functions $F_1$ and $F_2$ as illustrated in Equations 5 and 6 as one example.

$$p(L(e) | S(e), S(f), L(f)) = p(L(e) | F_1(S(e), S(f), L(f)))$$ [Equation 5]
$$= p(L(e) | Pos(e), Dst, L(f))$$

$$p(L(e) | S(e), S(f), L(f)) = p(L(e) | F_2(S(e), S(f), L(f)))$$ [Equation 6]
$$= p(L(e) | Dst, L(f))$$

In Equation 5 above, $F_1$ is a function to output a part of speech string Pos(e) of the target sentence and only a constraint of a translation order of words Dst included in the source sentence, as features from the syntax S(e) of the target sentence and the syntax S(f) of the source sentence, and intersyntax arrangement information.

Figure 6:
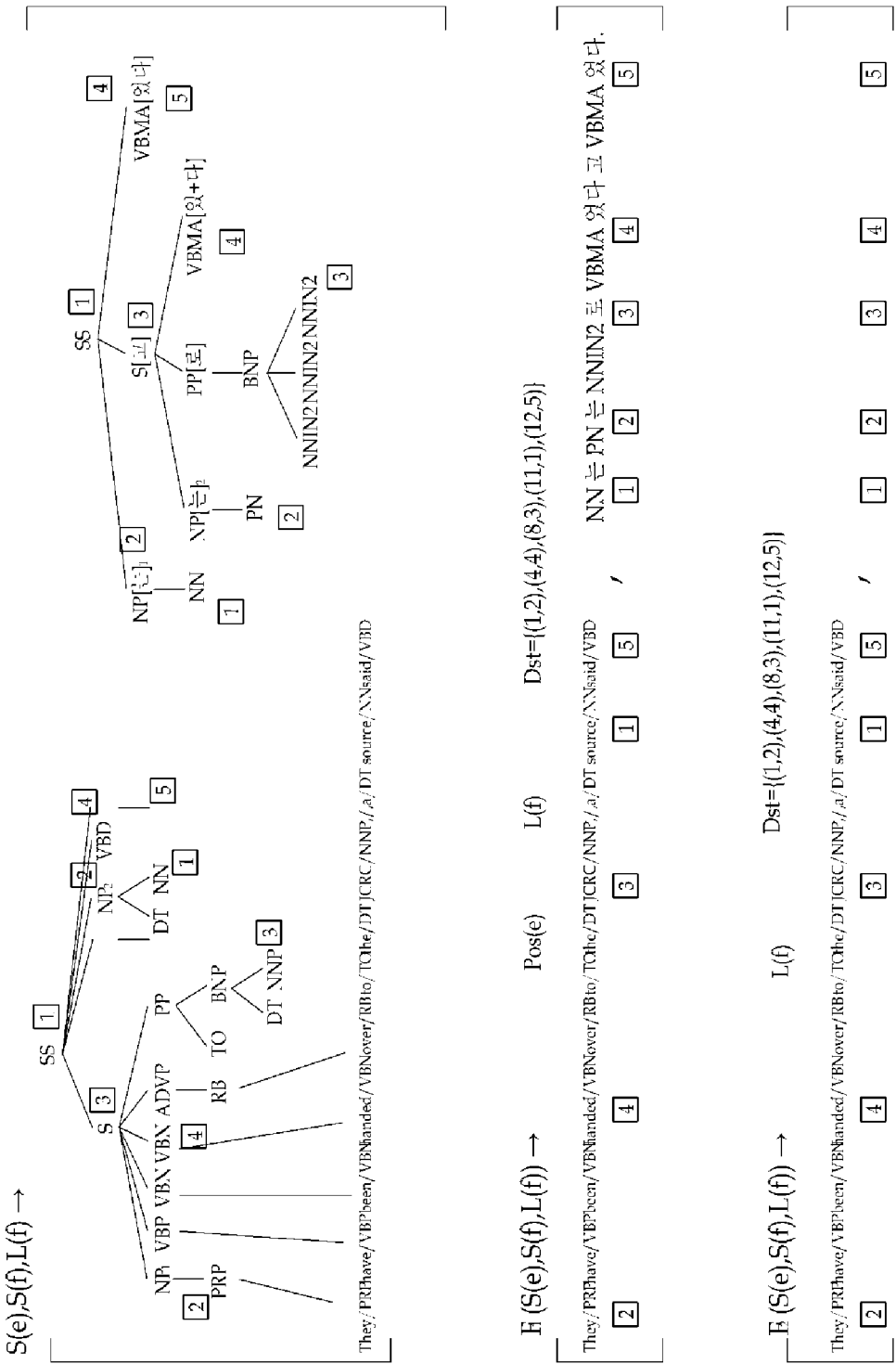
FIG. 6 is an exemplary diagram for describing a difference between the syntax conversion model and the word translation model according to the exemplary embodiment of the present invention.

In Equation 6, $F_2$ is a function to output only the translation order Dst of words included in the source sentence as a feature, as a constraint condition further alleviated than $F_1$. Examples of $F_1$ and $F_2$ are illustrated in FIG. 6. In FIG. 6, $F_1$ shows one example of creation of a vocabulary string based on the part of speech string information of the target sentence by using, as conditions, features for the part of speech string Pos(e) of the target sentence, the vocabulary string L(f) of the source sentence, and the arrangement order Dst in the target sentence of the words included in the source sentence, while $F_2$ shows one example in which the vocabulary string of the target sentence is generated by using, as a condition, only the features for the vocabulary string L(f) of the source sentence and the arrangement order Dst in the target sentence of the words included in the source sentence.

Further, the word translation model may be finally calculated in a long-linear mode using various features in addition to the conversion probability as used in the existing PBSMT.

$$p(L(e) | Dst, L(f)) = \exp \sum_i^n \lambda_i h_i(L(e), Dst, L(f))$$ [Equation 7]

Figure 4:
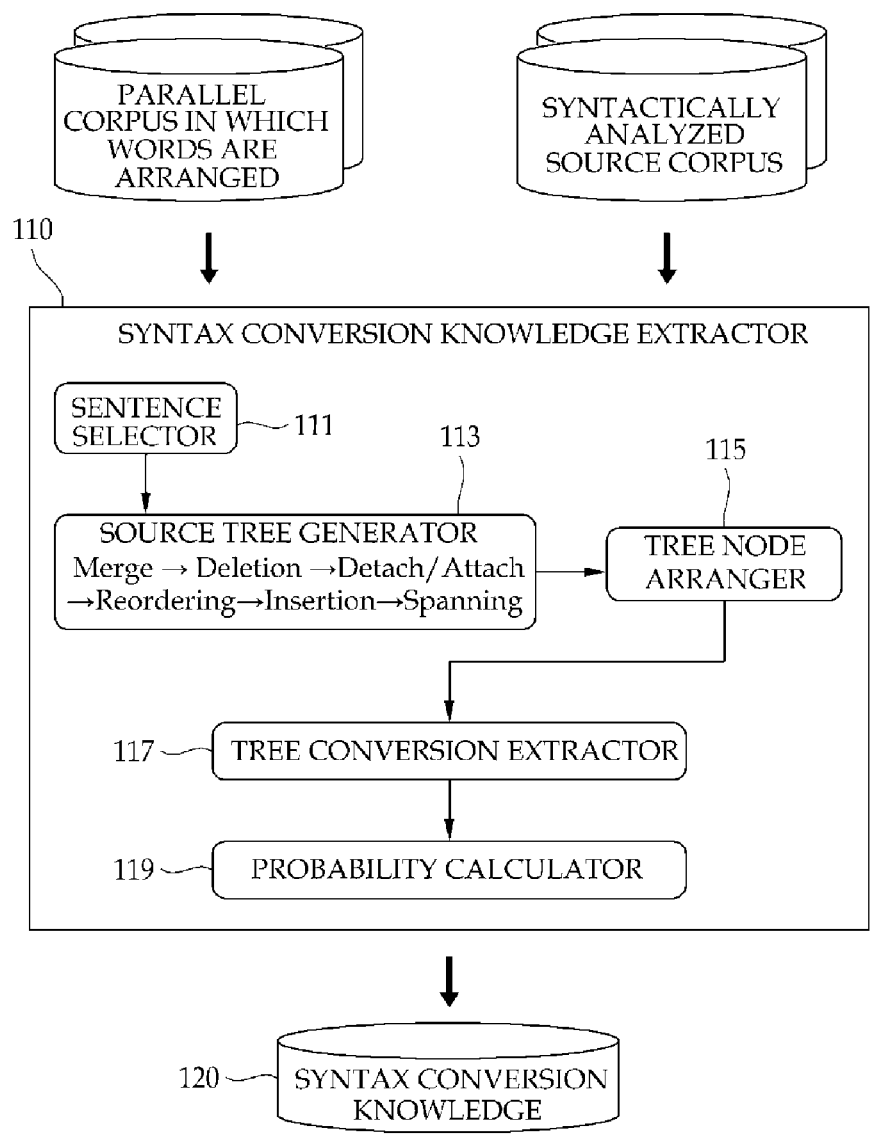
FIG. 4 is a diagram illustrating a detailed configuration of a syntax conversion knowledge extractor illustrated in FIG. 2.

The syntax conversion knowledge extractor 110 of the present invention, which is used to make a grammar conversion model includes components illustrated in FIG. 4 in detail.

The syntax conversion knowledge extractor 110 is used to extract knowledge and probability of respective derivations $d_i$ used in Equation 4 above. That is, a technology for extracting the syntax conversion knowledge in the related art performs node arrangement of a phrase tree of the source language and a phrase tree of the target language based on word reordering information and thereafter, extracts conversion knowledge based on the arranged nodes. However, in the method in the related art, the parser needs to be used with respect to both the source language and the target language, and an error propagation problem to the translation knowledge may occur by a method which is significantly subordinative to the performance of the parser.

However, the syntax conversion knowledge extractor 110 of the present invention performs syntax analysis of only a source corpus in order to extract the syntax conversion knowledge as illustrated in FIG. 4, a sentence selector 111 selects the syntactically analyzed source corpus and the word reordering information, and a source tree generator 113 performs six operations of merging, deletion, detaching/attaching, reordering, insertion, and spanning to thereby generates a target tree. In addition, a tree node reorderer 115 determines node arrangement based on a source tree and the target tree generated by the source tree generator 113 and thereafter, extracts conversion knowledge of the sub-tree in each node through a tree conversion knowledge extractor 117. The extraction is performed with respect to all sentences. Then, the probability calculator 119 statistically calculates a conversion probability and a creation probability with respect to the extracted knowledge.

Referring back to FIG. 2, the word translation knowledge extractor 130 in the translation model constructor 100 may be performed through Equations 5 and 6 above. Herein, it is assumed that phrase translation is independent from the translation order Dst of the words and a translation probability considering the position of the sentence is not additionally calculated. However, in order to constrain the part of speech string Pos(e) illustrated in Equation 5, the part of speech string of the target vocabulary string of each word translation knowledge needs to be additionally extracted and the probability thereof needs to be additionally calculated.

As a result, any word translation knowledge extractor 130 may be allowed if the word translation knowledge extractor 130 uses a method used in the existing phrase-based statistical machine translation (PBSMT), and in general, a conversion probability, a language model probability, and the like which may be used in Equation 7 above may be additionally calculated in this step.

The language model generator 150 may be constructed by using external modules an SRILM language modeling toolkit, an IRST language modeling toolkit, and the like and if the language model generator 150 shows an N-gram language model result, any one may be used.

The translation model learning device 300 learns a weight for each feature in Equation 7 above to generate a syntax conversion model and a word translation model.

The syntax converter 410 of the translated sentence generator 400 is a module that syntactically analyzes an input sentence and generates maximum N target trees having high scores by referring to the syntax conversion model learned in the syntax conversion knowledge extractor 110.

The syntax converter 410 stores an applicable rule while circulating the source tree generated with the highest probability with respect to a syntax analyzing result of an input source sentence from a lower node, and performs beam search in order to find N derivation sets having high scores. In this case, the scores are calculated by multiplying the conversion probability and the creation probability, and it is assumed that the rules are independent from each other.

The word translator 420 is a module that generates the target vocabulary string based on the word translation knowledge learned in the word translation knowledge extractor 130 by setting a constraint condition in the syntax of the target sentence generated in the syntax converter 410.

The syntax of the target sentence may be constrained through the feature functions including the vocabulary string/the syntax of the source sentence and the constraint condition of the part of speech string of the target sentence as illustrated in Equations 5 and 6 above. The constraint is reflected to a translation option feature function and a distortion (order rearrangement) feature function in Equation 7. The feature function value may be directly reflected to a phrase option constraint during phrase-based decoding and a distortion constraint. In this case, the feature functions $F_1$ and $F_2$ may be selected as options of a system and may be selected by a user according to the size of a phrase table.

Figure 5:
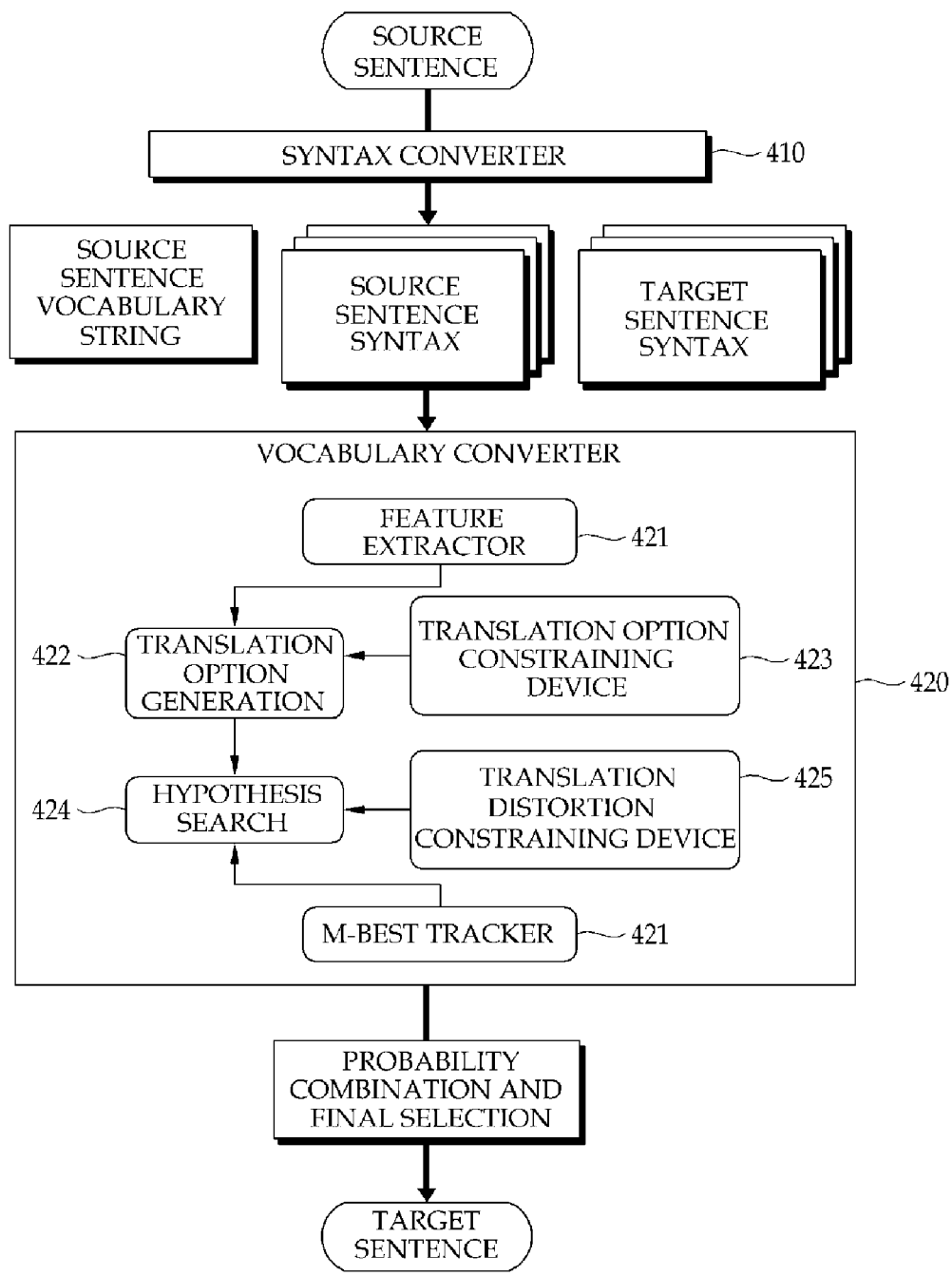
FIG. 5 is a diagram illustrating a word translator of the translated sentence generator according to the exemplary embodiment of the present invention.

In particular, a decoding process of the word translator 420 according to the present invention is as illustrated in FIG. 5.

Herein, as components different from the related art, a feature extractor 421, a translation option constraining device 423, a translation distortion constraining device 425, and an M-Best tracker 427 will be respectively described below.

The feature extractor 421 extracts features based on the vocabulary string of the source sentence, the syntax of the source sentence, and the syntax of the target sentence which are input into the word translator 420.

The translation option constraining device 423 may explicitly constrain the translation option from the part of speech string Pos(e) and the translation order Dst generated by the feature extractor 421. When pruning is not explicitly performed, a very low probability value is given to the translation option generated according to the existing method. Herein, the translation option means all available phrases which may be units of vocabulary translation.

The translation distortion constraining device 425 randomly determines the translation order without a fixed order according to the related art, but in the present invention, the translation order may be constrained by explicitly determining the translation order through constraint of the word order acquired through the feature extractor 421 or determining the translation order in terms of probability.

For example, the translation option is not randomly selected but may be explicitly constrained so as to determine the order by a target order or constrained in terms of probability so as to have a very low probability in the case of an order which violates a target position.

The M-Best tracker 427, which is a module for selecting M hypotheses having the highest scorers after performing hypothesis space search 424, outputs N vocabulary strings (derivation sets) by performing reverse tracking at a point where search ends. Only one hypothesis is finally selected in the related art, but as seen in Equation 3, a combination of the probabilities is required with respect to all available cases in which the same e is generated, and therefore, in the present invention, M hypotheses are selected.

Last, after the probabilities are combined with respect to the case in which the same sentence e is generated with respect to M hypotheses generated in N syntaxes, a target vocabulary string having the highest probability is selected as the translation sentence to be output.

Figure 7:
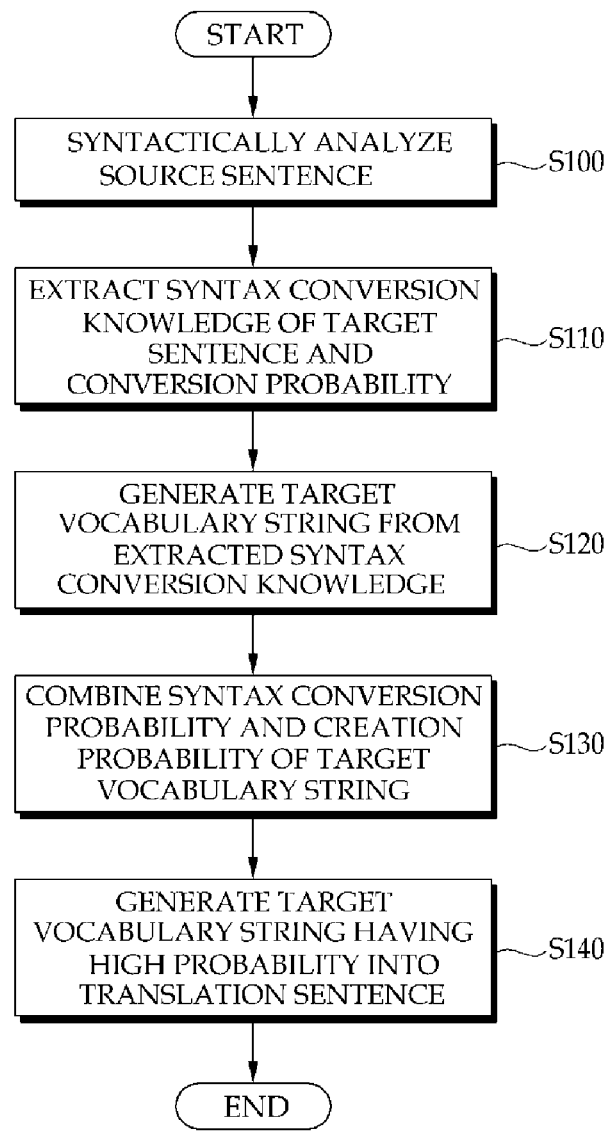
FIG. 7 is a flowchart entirely describing a machine translation method according to another exemplary embodiment of the present invention.

FIG. 7 is a flowchart entirely describing a machine translation method according to another exemplary embodiment of the present invention.

When the source is first input, the syntax converter of the translated sentence generator syntactically analyzes the source sentence input in real time to extract the syntax conversion knowledge and the syntax conversion probability for the target sentence (S100 and S110). The syntax conversion knowledge and the syntax conversion probability for the target sentence may be extracted through a translation model learned in advance, that is, the syntax conversion model.

Thereafter, the target vocabulary string is generated from the extracted syntax conversion knowledge (S120). The target vocabulary string may be extracted through the translation model learned in advance, that is, the word translation model.

In other words, a feature of the target sentence is extracted based on word reordering information and syntax analysis information of the source sentence input from the syntax converter of the translated sentence generator, the translation option to be constrained is set in the feature, and the hypothesis is retrieved by reflecting the set translation option to the feature. A method of selecting a target vocabulary string having a high probability is used by calculating a probability that the same target vocabulary string is generated with respect to the hypothesis after retrieval. Herein, the translation option includes conditions including the part of speech string, the translation word order, and the like.

Thereafter, the target vocabulary string having the high probability is generated as the translation sentence by combining the syntax conversion probability and the creation probability of the target vocabulary string (S130 and S140).

Figure 8:
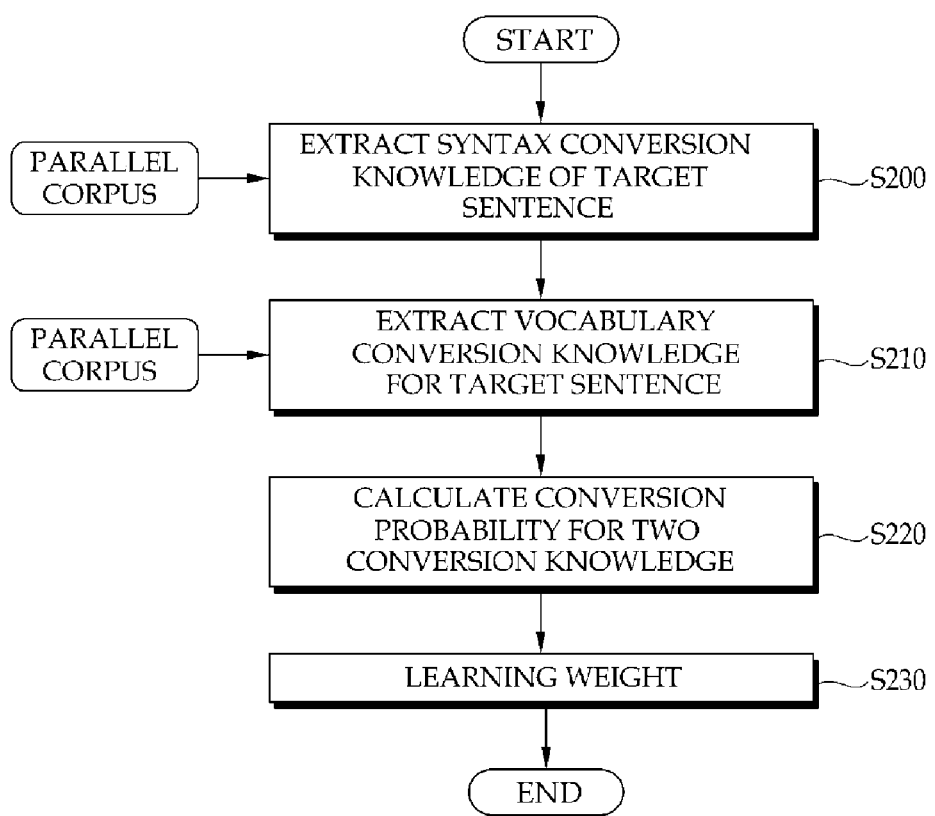
FIG. 8 is a flowchart describing a method of constructing a translation model for machine translation according to the exemplary embodiment of the present invention.

FIG. 8 is a flowchart describing a method of constructing a translation model for machine translation according to the exemplary embodiment of the present invention.

First, the syntax conversion knowledge for the target sentence is extracted from the parallel corpora by using the word reordering information between the source sentence and the target sentence and the syntax analysis information of the source sentence (S200). The method of extracting the syntax conversion knowledge includes a process of generating a syntax tree of the target sentence by using the word reordering information of the source sentence and the word reordering information of the target sentence, arranging nodes based on the generated syntax tree and the source tree by syntax analysis of the source sentence and thereafter, extracting conversion knowledge of the sub-tree in each node.

Thereafter, the word translation knowledge is extracted from the parallel corpora by using the word reordering information between the source sentence and the target sentence and the syntax analysis information of the source sentence (S210).

Thereafter, the conversion probabilities for the syntax conversion knowledge and the word translation knowledge are respectively calculated and a weight is learned with respect to each conversion probability to form the syntax conversion model and the word translation model, respectively (S220 and S230).

Meanwhile, the present invention can implement translation rule generation using the dependency forest and a machine translation method using the translation rule in a software program and apply the program to various reproduction apparatuses by recording the program in a predetermined computer-readable recording medium.

The various reproduction apparatuses may be a PC, a notebook, a portable terminal, and the like.

For example, the recording medium may be a hard disk, a flash memory, a RAM, a ROM and the like which are internal devices of each reproduction apparatus, or an optical disk such as a CD-R or a CD-RW, a compact flash card, smart media, a memory stick, and a multimedia card which are external devices of each reproduction apparatus.

In the above description, the present invention is just exemplified and various modifications can be made by those skilled in the art within a scope without departing from the spirit of the present invention. Therefore, the exemplary embodiments described in this specification of the present invention do not limit the present invention. The scope of the present invention should be construed by the appended claims and all technologies within the equivalent scope to that of the present invention should be construed as being included in the scope of the present invention.

INDUSTRIAL APPLICABILITY

Phrase-based or syntax-based statistical machine translation in the related art, fails to change a long-distance word order to generate a completely different sentence or has a problem in that a word order of a target sentence is correct, but simple word-to-word translation is achieved due to a shortage of translation knowledge, but in the present invention, two modelings of syntax conversion and word translation are performed from parallel corpora of a source language and a target language, and disadvantages of the phrase-based statistical machine translation and the syntax-based statistical machine translation may be resolved and advantages of the translations may be combined by decoding based thereon, and as a result, appropriate translation suitable for a context is performed to improve appropriateness and naturalness of a translation sentence.

The invention claimed is:

1. A statistical machine translation device, comprising:
a language model generator configured to generate a language model by extracting a creation probability of a language from a single corpus configured by a target language;
a syntax conversion knowledge extractor configured to:
extract syntax conversion knowledge for the target language by using word reordering information between a source language and the target language in a plurality of parallel corpora that does not include the single corpus, and syntax analysis information of the source language, and
calculate a syntax conversion probability with respect to the syntax conversion knowledge corresponding to the plurality of parallel corpora that does not include the single corpus;
a word translation knowledge extractor configured to:
extract word translation knowledge by using the word reordering information and the syntax analysis information, and
calculate a word translation probability with respect to the word translation knowledge based on a feature function in which a predetermined constraint condition is defined in the word reordering information and the syntax analysis information;
a translation model learning device configured to generate a syntax conversion model and a word translation model by learning the syntax conversion knowledge, the word translation knowledge, the syntax conversion probability and the word translation probability; and
a translated sentence generator configured to:
decode a source sentence into the target sentence by applying the syntax conversion model and the word translation model; and
generate a target vocabulary string having a high probability into a final translation sentence by combining the syntax conversion probability and the creation probability,
wherein the syntax conversion knowledge extractor includes:
a tree generator configured to generate a target tree of the target language by using the word reordering information and the syntax analysis information,
a tree node reorderer configured to reorder nodes based on the target tree and a source tree depending on the syntax analysis information of the source language,
a tree conversion knowledge extractor configured to extract the syntax conversion knowledge of a sub-tree at each reordered node of the target tree and the source tree, and
a probability calculator configured to calculate the syntax conversion probability with respect to the syntax conversion knowledge,
wherein the feature function is a function configured to constrain, from a syntax of the target language and a syntax of the source language, and intersyntax arrangement information between the syntax of the target language and the syntax of the source language:
a part of speech string of the target language, and
a translation order of words included in the source language, and output the constrained part of speech string and translation order as a feature.

2. A translation sentence generating apparatus, comprising:
a syntax converter configured to:
analyze a syntax of a source sentence,
extract syntax conversion knowledge of a target sentence from the analyzed syntax of the source sentence, and
calculate a syntax conversion probability with respect to the syntax conversion knowledge based on a plurality of parallel corpora that does not include a first corpus of a target language;
a feature extractor configured to extract a feature constraining a part of speech string, a constraint of the word order and a translation order of the source sentence based on word reordering information between a source language and the target language, syntax analysis information of the source sentence, and the syntax conversion knowledge of the target sentence;
a translation option constraining device configured to constrain a translation option from the part of speech string and the translation order;
a translation distortion constraining device configured to rearrange the translation order by the constraint of the word order;

a hypothesis searcher configured to search a hypothesis by reflecting the constrained translation option and the rearranged translation order to the feature;

a tracker configured to select a target vocabulary string having a creation probability for creation of same target vocabulary string with respect to the hypothesis, wherein the creation probability is calculated based on the first corpus of the target language;

a probability calculator configured to:
  generate a combined probability by combining the creation probability of the selected target vocabulary string with the syntax conversion probability, and
  generate a target vocabulary string having the highest combined probability into a translation sentence, wherein the syntax converter includes:
  a tree generator configured to generate a target tree of the target language by using the word reordering information and the syntax analysis information,
  a tree node reorderer configured to reorder nodes based on the target tree and a source tree depending on the syntax analysis information,
  a tree conversion knowledge extractor configured to extract the syntax conversion knowledge of a sub-tree at each reordered node of the target tree and the source tree.

3. A method for constructing a translation model, the method performed by a machine translation device including a processor and comprising:
  generating a language model by extracting a creation probability of a language from a single corpus configured by a target language;
  generating a syntax tree of the target language by using word reordering information between a source language and the target language in a plurality of parallel corpora that does not include the single corpus;
  arranging nodes based on the syntax tree and syntax analysis information of the source language;
  extracting syntax conversion knowledge of a sub-tree at each node of the arranged nodes;
  extracting word translation knowledge by using the word reordering information and the syntax analysis information;
  calculating a syntax conversion probability with respect to the syntax conversion knowledge and a word translation probability with respect to the word translation knowledge by applying a feature function in which a predetermined constraint condition is defined in the word reordering information and syntax analysis information of the target language;
  generating a target vocabulary string having a high probability into a final translation sentence by combining the syntax conversion probability and the creation probability;
  making a weight to be learned with respect to the syntax conversion probability and word translation probability,
  wherein the feature function uses a function:
    constraining a part of speech string of the target language and a translation order of words included in the source language from a syntax of the target language and a syntax of the source language, and intersyntax arrangement information, and
    outputting the constrained part of speech string and translation order as the feature.

4. A non-transitory computer-readable recording medium recording a computer program for translating a source sentence, the computer program comprising:
  analyzing a syntax of the source sentence;
  generating a syntax tree of a target language by using word reordering information between a source language and the target language in the plurality of parallel corpora that does not include a first corpus;
  arranging nodes based on the syntax tree and the analyzed syntax analysis information of the source sentence;
  extracting syntax conversion knowledge of a sub-tree at each node of the arranged nodes;
  calculating a syntax conversion probability with respect to the syntax conversion knowledge;
  extracting a feature to constrain a part of speech string, a constraint of the word order and a translation order of the source sentence based on the word reordering information between the source language and the target language, the syntax analysis information of the source sentence, and the syntax conversion knowledge;
  generating a constraint of a translation option from the part of speech string and the translation order;
  rearranging the translation order by the constraint of the word order;
  searching a hypothesis by reflecting the constraint of the translation option and the rearranged translation order to the feature;
  selecting a target vocabulary string having a creation probability for creation of same target vocabulary string with respect to the hypothesis from the first corpus configured by a target language;
  combining the creation probability with the syntax conversion probability; and
  generating a target vocabulary string having the highest probability among the creation probability and the syntax conversion probability into a translation sentence.

5. A method for translating a source sentence, the method performed by a machine translation device including a processor and comprising:
  analyzing a syntax of the source sentence;
  generating a syntax tree of a target language by using word reordering information between a source language and the target language in the plurality of parallel corpora that does not include a first corpus;
  arranging nodes based on the syntax tree and the analyzed syntax analysis information of the source sentence;
  extracting syntax conversion knowledge of a sub-tree at each node of the arranged nodes;
  calculating a syntax conversion probability with respect to the syntax conversion knowledge;
  extracting a feature to constrain a part of speech string, a constraint of the word order and a translation order of the source sentence based on word reordering information between the source language and the target language, the syntax analysis information of the source sentence, and the syntax conversion knowledge;
  generating a constraint of a translation option from the part of speech string and the translation order;
  rearranging the translation order by the constraint of the word order;
  searching a hypothesis by reflecting the constraint of the translation option and the rearranged translation order to the feature;
  selecting a target vocabulary string having a creation probability for creation of same target vocabulary string with respect to the hypothesis from the first corpus configured by a target language;
  combining the creation probability with the syntax conversion probability; and generating a target vocabulary string having the highest probability into a translation sentence.

6. The method of claim 5, wherein the extracting syntax conversion knowledge includes;
generating a syntax tree of the target sentence by using the word reordering information of the source sentence and word reordering information of the target sentence in the plurality of parallel corpora;
arranging nodes based on a syntax tree of the target sentence and a source tree according to syntax analysis information of the source sentence; and
extracting syntax conversion knowledge of a sub-tree at each node.

* * * * *